Feb. 28, 1967     C. M. MORROW     3,307,182
RADAR SYSTEM
Filed Aug. 28, 1964     3 Sheets-Sheet 1
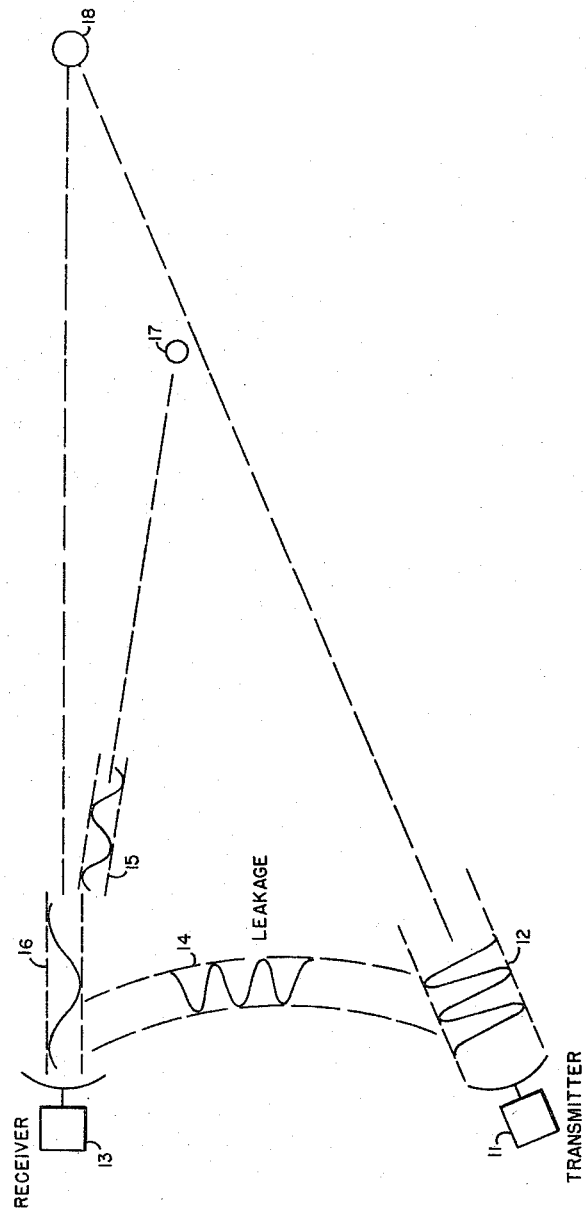
INVENTOR
CHRISTOPHER M. MORROW
BY *James G. Murray*
ATTORNEYS

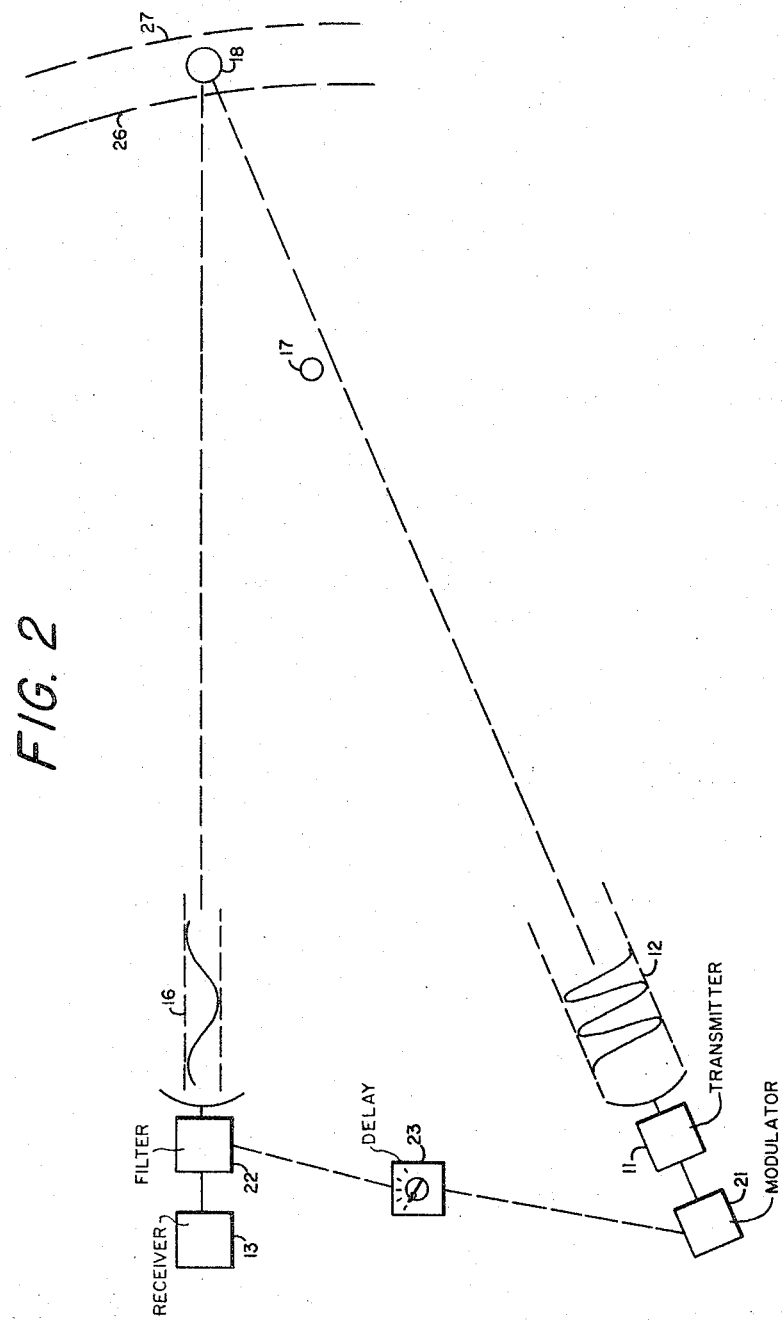

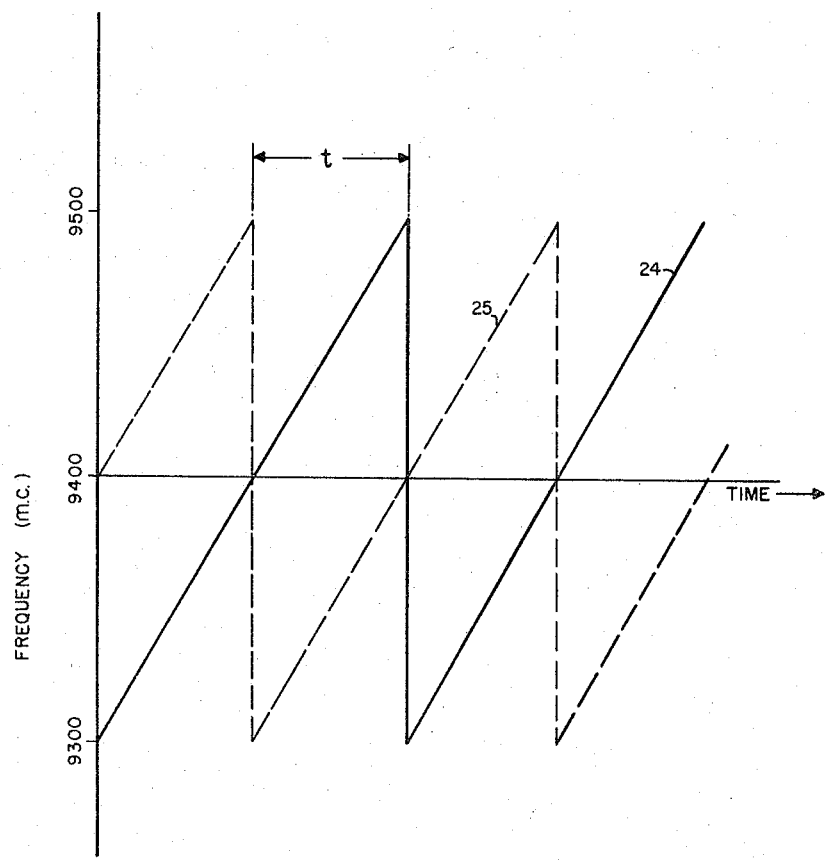

United States Patent Office 3,307,182
Patented Feb. 28, 1967

3,307,182
RADAR SYSTEM
Christopher M. Morrow, 7804 Recard Lane, Hollin Hills, Alexandria, Va. 22307
Filed Aug. 28, 1964, Ser. No. 392,974
10 Claims. (Cl. 343—14)

The invention described herein may be manufactured and used by or for the Government of the United States of America for governmental purposes without the payment of any royalties thereon or therefor.

This invention relates to a radar system and more particularly to a CW/FM (continuous wave, frequency modulated) radar system which utilizes a filter in the receiver for receiver-transmitter isolation and for range gating.

In CW/FM radar systems, the transmitted CW signal is continuously frequency modulated over the operational frequency range. Because of the travel time required for the signal to go from the transmitter to a distant object and to be reflected to the receiver, the frequency of the signal arriving at the receiver is different from the frequency of the signal then being transmitted. This frequency difference is the parameter conventionally measured to establish the distance of the reflecting object. As this distance, or range, increases, the strength of the received signal decreases in an approximate fourth power relationship.

In prior CW/FM radar systems, the useful range of the system was largely determined by the degree of energy isolation provided between the transmitter and receiver, that is, the maximum useful range is usually the range beyond which the reflected signal is so weak as to be irretrievable swamped by the energy leaking into the receiver from the transmitter.

The general purpose of this invention, which is compatible with the present CW/FM radar systems, is to significantly improve the isolation between the transmitter and receiver and thereby greatly increase the range capability of the CW/FM radar system while simultaneously limiting the radar system search to a desired range.

It is therefore an object of the invention to improve the capabilities of CW/FM radar systems.

A further object of the present invention is the provision of means, compatible with present CW/FM radar systems, which will improve the isolation between the transmitter and receiver and thereby increase the S/N (signal to noise ratio) and the maximum useful range capabilities of these radar sets.

Yet another object of the present invention is the provision of means, compatible with present CW/FM radar systems, which will increase the maximum useful range capability of the radar system while simultaneously providing a range gate for limiting the radar system search to a desired range.

Other objects and many of the attendant advantages of this invention will be readily appreciated as the same becomes better understood by reference to the following detailed description of an embodiment of the invention when considered in connection with the accompanying drawings in which like reference numerals designate like parts throughout the figures thereof and wherein:

FIG. 1 is a generalized illustration of a CW/FM radar system;

FIG. 2 is a block diagram of a CW/FM radar system which includes the present invention and FIG. 3 graphically illustrates relationships which are helpful in understanding the invention.

Referring now to the drawings, and in particular to FIG. 1, the reference numeral 11 designates a conventional CW/FM radar transmitter wherein the transmitted signal 12 is a continuous wave which is constantly being frequency modulated over a predetermined frequency range. The reference numeral 13 designates a conventional CW/FM radar receiver which is illustrated as being separated from the transmitter 11, this being one of the conventional expedients used to isolate the receiver 13 from the energy being propagated by the transmitter 11. However, the effectiveness of the separation is limited and leakage 14 occurs and may be of such magnitude as to swamp the weaker signals 15 and 16 which are reflected from the distant targets 17 and 18. The leakage 14, therefore, severely limits the maximum useful range capability of the conventional CW/FM radar system illustrated in FIG. 1.

It is interesting to note relationships which are, because of drafting limitations, imperfectly illustrated in scale in FIG. 1. The numeral 12 is representative of the transmitted signal which has, by modulation, been increasing in frequency and which, because of the antenna gain pattern, is of maximum amplitude in the direction the antenna is pointing. The numeral 14 is representative of the leakage energy arriving at the receiver and, because of the distance from the receiver to the transmitter and because of the antenna gain pattern, is of slightly lower frequency and much less magnitude than the transmitted signal 12. The reflected signal 15, which is reflected to receiver 13 from target 17, because of the obvious relative distances, is lower in frequency than the leakage frequency but higher in frequency than the reflected signal 16, from target 18. However, because target 18 has a larger effective reflecting area than target 17, the signals 15 and 16 are approximately of the same magnitude.

In FIG. 2 there is illustrated a CW/FM radar system according to the present invention. The frequency of the signal 12, which is propagated by transmitter 11, is controlled by modulator 21, which while implied, was not illustrated in FIG. 1. Modulator 21 may, for example, be a sawtooth voltage generator which linearly sweeps the signal 12 through the X band frequency range of 9300 to 9500 mc. as illustrated by curve 24 in FIG. 3. It is obvious, of course, that both the frequency range and the modulation pattern are merely exemplary and that other frequency ranges and other modulation patterns, such as a sinusoidal frequency variation, could be utilized.

In the receiver 13, the voltage controlled band pass filter 22 is controlled to vary the center frequency of the pass band through the 9300–9500 mc. frequency range by the voltage from modulator 21 after a controlled time delay $t$ by device 23. The curve 25 in FIG. 3 is representative of the variation of the center frequency of the pass band of filter 22 as controlled by the voltage from modulator 21.

The time delay $t$ which device 23 interposes between the modulation pattern of signal 12 illustrated by curve 24, and the variation of the center frequency of the pass band of filter 22, illustrated by curve 25, determines the range wherein the radar system will sense a target, that is, the variable delay from 23 controlling filter 22 acts as an adjustable range gate. In other words, the time delay $t$ imposed by device 23, may be adjusted to vary the location of boundaries 26 and 27 of the area wherein a target, such as 18, will be sensed. As the time delay $t$ is increased, the boundaries 26 and 27 will move further from the radar equipment. This is, of course, apparent from the equality between the time delay $t$ and the round trip propagation time from the radar equipment to the area defined by boundaries 26 and 27.

It will be recognized that the extent of the area defined by boundaries 26 and 27 will be related to the width of the pass band of filter 22. For a filter having a narrow pass band, that is a high Q, the area between boundaries 26 and 27 will be small and the target distance will be very accurately determinable. As illustrated in FIG. 2, the range gating effect of filter 22 simplifies the receiver information by rejecting the signal 15 reflected from target 17, since the signal 15 is not within the pass band of filter 22.

As is also illustrated in FIGS. 1 and 2, a CW/FM radar system according to the present invention will isolate the receiver from the transmitter 11 because filter 22 will also reject leakage 14 since the frequency of leakage 14 is not within the pass band of filter 22. The present conventional methods of obtaining isolation between CW/FM receivers and transmitters include separation of the receiving and transmitting antennas and designing these antennas to be highly directional. Such methods have produced, in practical radar sets, an isolation of 50 db. According to the present invention an isolation of 100 db is obtainable with less direction gain and separation of the receiving and transmitting antennas. It is of interest to note that maximum isolation, according to the present invention, will occur if, as illustrated in FIG. 3, the frequency of the modulation of signal 12 and the range being scanned are correlated so that there is a 180° delay between the transmitted signal modulation and the sweep of the filter. Expressed slightly differently, maximum isolation between receiver and transmitter will occur when the difference between the frequency of signal 14, which is almost identical to the frequency of signal 12, and the frequency of the center of the pass band of filter 22 is a maximum. It is also to be recognized that the degree of isolation is related to the width of the pass band, a narrower pass band filter 22 providing the better isolation of receiver 13 from transmitter 11.

The present invention does not depend on the use of any specific filter 22, although as previously pointed out, the characteristics of filter 22 are directly related to the isolation and range gate features of a CW/FM radar system according to this invention. While any suitable filter known in the art can be used as filter 22, the invention envisions that filter 22 would preferably be similar to a yttrium-iron-garnet magnetically tuned microwave resonator or to a narrow band traveling wave or backward wave amplifier wherein an acceptance band pass of less than 1% of the center frequency may be electronically scanned over a bandwidth of approximately 20% of the center frequency. A yttrium-iron-garnet filter, suitable for use as filter 22, is the Model WJ-506 filter sold commercially by the Watkins-Johnson Company, 3333 Hillview Avenue, Palo Alto, California, and described in that company's specification sheet dated October 1, 1962, and in a Watkins-Johnson Company Technical Bulletin, vol. 4, No. 8, dated October 1962. A backward wave travelling wave tube amplifier, suitable for use as filter 22, is the Model BA-2 sold commercially by the Huggins Laboratories, Inc., 711 Hamilton Avenue, Menlo Park, California, and described in that company's data sheet dated June 1, 1957.

The operation of a CW/FM radar system according to the present invention is by now, no doubt, clear. The device 23 is adjusted to provide a time delay $t$ related to the range defined by boundaries 26 and 27 wherein the operator wishes to scan. Coincidently, either by manual or automatic adjustment, the frequency of modulator 21 is adjusted to provide a 180° phase difference between the modulator 21 and the sweep of filter 22. The filter will then bar from receiver 13 all signals and leakage except signals reflected from targets within the boundaries 26 and 27. As a result of the rejection of leakage, the system will be capable of detecting much weaker reflected signals from targets at much greater ranges than is possible with conventional CW/FM radar systems.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. The method of improving transmitter-receiver isolation and obtaining range gating in a CW/FM radar system, having a transmitter which transmits a signal and receiver which includes a tunable filter, comprising the steps of:
    frequency modulating the transmitter signal according to a predetermined repetitive pattern;
    tuning said filter according to a pattern which is displaced in time but otherwise similar to the repetitive pattern of the transmitter signal modulation
    whereby the receiver will sense only those transmitted signals which are reflected from a target in a predetermined area.

2. The method set forth in claim 1 and further including the step of coordinating the rate of repetition of said transmitter modulation and filter tuning patterns and the distance of said predetermined area so that said transmitter modulations and filter tuning patterns are 180° out of phase.

3. A CW/FM radar system comprising:
    transmitter means for transmitting a frequency modulated continuous wave signal;
    receiver means for receiving portions of said transmitted signal which are reflected from distant targets;
    a tunable filter connected to said receiver means, and
    tuning means which are time displaced in frequency coordination with the modulation of said transmitted signal for tuning said tunable filter
    whereby said filter isolates said receiver means from said transmitter means and causes said receiver means to receive only the transmitted signals reflected from targets which are within a predetermined area.

4. A CW/FM radar system comprising:
    transmitter means for transmitting a continuous wave signal;
    modulator means connected to said transmitter means for modulating the frequency of said continuous wave transmitted signal according to a predetermined repetitive pattern;
    receiver means for receiving portions of said continuous wave transmitted signal which are reflected from distant targets;
    tunable band pass filter means connected to said receiver means to reject from said receiver means all signals of a frequency not within the pass band of said filter means and
    tuning means connected to said modulator means and to said tunable filter means to tune said filter means according to a pattern which is time displaced but otherwise similar to the predetermined repetitive pattern imposed by said modulator means on said continuous wave transmitted signal
    whereby said tunable filter means isolates said receiver means from said transmitter means and causes said receiver means to receive only the transmitted signals reflected from targets which are within a predetermined area.

5. A CW/FM radar system as set forth in claim 4 wherein said tuning means includes an adjustable time delay device.

6. A CW/FM radar system as set forth in claim 5 wherein said tunable band pass filter means includes a yttrium-iron-garnet magnetically tuned microwave resonator.

7. A CW/FM radar system as set forth in claim 5 wherein said tunable band pass filter means includes a narrow band traveling wave amplifier.

8. A CW/FM radar system as set forth in claim 4 wherein said pattern of transmitted signal modulation and said time displaced, similar pattern of filter means tuning is 180° out of phase.

9. A CW/FM radar system as set forth in claim 8 wherein said tunable band pass filter means includes a yttrium-iron-garnet magnetically tuned microwave resonator.

10. A CW/FM radar system as set forth in claim 8 wherein said tunable band pass filter means includes a narrow band traveling wave amplifier.

References Cited by the Examiner
UNITED STATES PATENTS 2,011,392   8/1935   Bently _____ 343—14

CHESTER L. JUSTUS, *Primary Examiner.*
RODNEY D. BENNETT, *Assistant Examiner.*